US011657475B2

(12) United States Patent
Bongio Karrman et al.

(10) Patent No.: US 11,657,475 B2
(45) Date of Patent: May 23, 2023

(54) MACHINE LEARNED REGISTRATION AND MULTI-MODAL REGRESSION

(71) Applicant: Raytheon Company, Waltham, MA (US)

(72) Inventors: Anton Bongio Karrman, Los Angeles, CA (US); Ryan C. Fan, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 306 days.

(21) Appl. No.: 16/935,630

(22) Filed: Jul. 22, 2020

(65) Prior Publication Data

US 2021/0027417 A1  Jan. 28, 2021

Related U.S. Application Data

(60) Provisional application No. 62/877,182, filed on Jul. 22, 2019, provisional application No. 62/877,167, filed on Jul. 22, 2019.

(51) Int. Cl.
*G06T 3/00* (2006.01)
*G06T 7/50* (2017.01)
(Continued)

(52) U.S. Cl.
CPC ............ *G06T 3/0068* (2013.01); *G01S 13/90* (2013.01); *G06N 20/00* (2019.01); *G06N 20/20* (2019.01);
(Continued)

(58) Field of Classification Search
None
See application file for complete search history.

(56) References Cited

U.S. PATENT DOCUMENTS

2018/0172824 A1* 6/2018 Beckett ................ B64G 1/1085
2019/0130253 A1  5/2019 Schultz et al.
(Continued)

FOREIGN PATENT DOCUMENTS

CN   108983228 A  * 12/2018  ............. G01S 13/89
CN   109636742 A  *  4/2019  ........... G06N 3/0454
(Continued)

OTHER PUBLICATIONS

Merkle, Nina, et al. "Exploiting deep matching and SAR data for the geo-localization accuracy improvement of optical satellite images." Remote Sensing 9.6 (Jun. 2017): 586. (Year: 2017).*
(Continued)

*Primary Examiner* — Emily C Terrell
*Assistant Examiner* — Nathan J Bloom
(74) *Attorney, Agent, or Firm* — Schwegman Lundberg & Woessner, P.A.

(57) ABSTRACT

Systems, devices, methods, and computer-readable media for image processing by machine learning are provided. A method can include providing, as input to a machine learning (ML) model for image processing, data of a first image, receiving, from the ML model, an estimated radar cross section (RCS) of the first image, receiving, from the ML model, estimated transformation parameters that project the first image to a second image space, and applying the estimated transformation parameters to the estimated RCS to generate an estimated second image in the second image space.

18 Claims, 4 Drawing Sheets

(51) Int. Cl.
*G06T 7/30* (2017.01)
*G06N 20/00* (2019.01)
*G06T 7/73* (2017.01)
*G06N 20/20* (2019.01)
*G01S 13/90* (2006.01)

(52) U.S. Cl.
CPC .................. *G06T 7/30* (2017.01); *G06T 7/50* (2017.01); *G06T 7/74* (2017.01); *G06T 2207/10044* (2013.01); *G06T 2207/10072* (2013.01); *G06T 2207/20076* (2013.01); *G06T 2207/20081* (2013.01); *G06T 2207/20224* (2013.01); *G06T 2207/30244* (2013.01)

(56) References Cited

U.S. PATENT DOCUMENTS

| 2019/0318474 | A1 | 10/2019 | Han |
| 2020/0258296 | A1* | 8/2020 | Pennings .................. G06T 5/50 |
| 2021/0027113 | A1 | 1/2021 | Goldstein et al. |
| 2021/0027207 | A1 | 1/2021 | Bongio Karrman et al. |

FOREIGN PATENT DOCUMENTS

| WO | WO-2021015840 A1 | 1/2021 |
| WO | WO-2021016352 A1 | 1/2021 |
| WO | WO-2021016358 A1 | 1/2021 |

OTHER PUBLICATIONS

Abulkhanov, Dmitry, et al. "Neural network-based feature point descriptors for registration of optical and SAR images." Tenth International Conference on Machine Vision (ICMV 2017). vol. 10696. SPIE, Apr. 2018. (Year: 2017).*
Zhang, Han, et al. "Registration of multimodal remote sensing image based on deep fully convolutional neural network." IEEE Journal of Selected Topics in Applied Earth Observations and Remote Sensing 12.8 (Jun. 2019): 3028-3042. (Year: 2019).*
U.S. Appl. No. 16/518,728, filed Jul. 22, 2019, Cross-Modality Automatic Target Recognition.
U.S. Appl. No. 16/935,646, filed Jul. 22, 2020, Cross-Modality Image Generation.
Forget, Yann, et al., "Fusion Scheme for Automatic and Large-Scaled Built-up Mapping", IEEE. IGARSS, (2018), 2072-2075.
Jain, V, et al., "A Multi-Sensor Fusion Framework in 3D", IEEE Conference on Computer Vision and Pattern Recognition Workshops., (2013), 6 pgs.
Kim, Kyoung Soo, et al., "Robust Multi-Sensor Image Registration by Enhancing Statistical Correlation", 7th International Conference on Information Fusion (Fision), (2005), 380-386.
Lavely, Eugene, et al., "Model-based, multi-sensor fusion and bundle adjustment for image registration and target recognition", Algorithms for Synthetic Aperture Radar Imagery XIII, Proc. SPIE 6237, 62370R, (2006), 1-13.
Li, Y, "Multimodal Image Registration with Line Segments by Selective Search", IEEE Transactions on Cybernetics, vol. 47, No. 5, (May 2017), 1285-1298.
Mahjourian, Reza, et al., "Unsupervised Learning of Depth and Ego-Motion from Monocular Video Using 3D Geometric Constraints", arXiv:1802.05522v2 [cs.CV], (2018), 9 pgs.
Ronneberger, Olaf, et al., "U-Net Convolutional Networks for Biomedical Image Segmentation", Computer Science Department and BIOSS Centre for Biological Signalling Studies,University of Freiburg, Germany, (May 18, 2015), 234-241.
Ross, W D, et al., "Multi-sensor 3D image fusion and interactive search", Proceedings of the Third International Conference on Information Fusion, vol. 1, (2000), 10-17.
Schmitt, M, et al., "The Sen1-2 Dataset for Deep Learning in SAR-Optical Data Fusion", Commission I, WG I/3. arXiv:1807.

01569v1 [cs.CV], [Online], Retrieved from the Internet: <URL: https://arxiv.org/abs/1807.01569>, (2018), 6 pgs.
Wang, Puyang, et al., "Generating High Quality Visible Images from SAR Images Using CNNs", arXiv:1802.10036v1 [cs.CV], [Online], Retrieved from the Internet: <URL: https://arxiv.org/abs/1802.10036>, (2018), 6 pgs.
Zhou, Tinghui, et al., "Unsupervised Learning of Depth and Ego-Motion form Video", CVPR. arXiv:1704.07813, (2017), 10 pgs.
"U.S. Appl. No. 16/518,728, Examiner Interview Summary dated Feb. 9, 2022", 2 pgs.
"U.S. Appl. No. 16/518,728, Non Final Office Action dated Nov. 4, 2021", 13 pgs.
"U.S. Appl. No. 16/518,728, Notice of Allowance dated Feb. 23, 2022", 15 pgs.
"U.S. Appl. No. 16/518,728, Response filed Feb. 4, 2022 to Non Final Office Action dated Nov. 4, 2021", 8 pgs.
"U.S. Appl. No. 16/935,646, Corrected Notice of Allowability dated Mar. 21, 2022", 5 pgs.
"U.S. Appl. No. 16/935,646, Non Final Office Action dated Sep. 22, 2021", 16 pgs.
"U.S. Appl. No. 16/935,646, Notice of Allowance dated Feb. 11, 2022", 8 pgs.
"U.S. Appl. No. 16/935,646, Response filed Dec. 22, 2021 to Non Final Office Action dated Sep. 22, 2021", 7 pgs.
"International Application Serial No. PCT/US2020/033812, International Preliminary Report on Patentability dated Feb. 3, 2022", 8 pgs.
"International Application Serial No. PCT/US2020/043071, International Preliminary Report on Patentability dated Feb. 3, 2022", 9 pgs.
"International Application Serial No. PCT/US2020/043085, International Preliminary Report on Patentability dated Feb. 3, 2022", 8 pgs.
Chen, Yunfan, et al., "Multi-layer fusion techniques using a CNN for multispectral pedestrian detection", The Institute of Engineering and Technology Journal, (2018).
Huang, et al., "Automatic Classification of Retinal Optical Coherence Tomography Images with Layer Guided Convolutional Neural Network", IEEE Signal Processing Letters, vol. 26, No. 7, (Jul. 2019).
"International Application Serial No. PCT/US2020/033812, International Search Report dated Aug. 11, 2020", 3 pgs.
"International Application Serial No. PCT/US2020/033812, Written Opinion dated Aug. 11, 2020", 6 pgs.
"International Application Serial No. PCT/US2020/043071, International Search Report dated Nov. 2, 2020", 3 pgs.
"International Application Serial No. PCT/US2020/043071, Written Opinion dated Nov. 2, 2020", 7 pgs.
"International Application Serial No. PCT/US2020/043085, International Search Report dated Nov. 2, 2020", 3 pgs.
"International Application Serial No. PCT/US2020/043085, Written Opinion dated Nov. 2, 2020", 6 pgs.
Andreas, Ley, et al., "Exploiting GAN-Based SAR to Optical Image Transcoding for Improved Classification via Deep Learning", EUSAR, 12th European Conference on Synthetic Aperture Radar, (Jun. 7, 2018), 396-401.
Grohnfeldt, Claas, et al., "A Conditional Generative Adversarial Network to Fuse Sar And Multi spectral Optical Data for Cloud Removal from Sentinel-2 Images", IGARSS IEEE International Geoscience And Remote Sensing Symposium, IEEE, (Jul. 22, 2018), 1726-1729.
Matthias, Limmer, et al., "Infrared Colorization Using Deep Convolutional Neural Networks", (Apr. 8, 2016).
Merkle, Nina, et al., "Exploring the Potential of Conditional Adversarial Networks for Optical and SAR Image Matching", IEEE Journal of Selected Topics In Applied Earth Observations And Remote Sensing, IEEE, USA, vol. 11, No. 6, (Jun. 1, 2018), 1811-1820.
Namil, Kim, et al., "Multispectral Transfer Network: Unsupervised Depth Estimation for All-Day Vision", AAAI Conference on Artificial Intelligence, (Apr. 1, 2018), 6983-6991.
Qayynm, Usman, et al., "Thermal colorization using deep neural network", 15th International Bhurban Conference on Applied Sciences and Technology (IBCAST), IEEE, (Jan. 9, 2018), 325-329.

(56) References Cited

OTHER PUBLICATIONS

Quan, Dou, et al., "Using deep neural networks for synthetic aperture radar image registration", IEEE International Geoscience and Remote Sensing Symposium (IGARSS), IEEE, (Jul. 10, 2016), 2799-2802.
Shi, Lei Fu, et al., "Reciprocal Translation between SAR and Optical Remote Sensing Images with Cascaded-Residual Adversarial Networks", Arxlv.Org, Cornell University Library, 201 Olin Library Corneil University Ithaca, NY, (Jan. 24, 2019).
Tao, Junyi, et al., "Automatic SAR Simulation Technique for Object Identification in Complex Urban Scenarios", IEEE Journal of Selected Topics in Applied Earth Observations And Remote Sensing, IEEE, USA, vol. 7, No. 3, (Mar. 1, 2014), 994-1003.
Zhou, Tinghui, et al., "Unsupervised Learning of Depth and Ego-Motion from Video", IEEE Conference on Computer Vision and Pattern Recognition (CVPR), IEEE Computer Society, US, (Jul. 21, 2017), 6612-6619.

* cited by examiner

MACHINE LEARNED REGISTRATION AND MULTI-MODAL REGRESSION

RELATED APPLICATIONS

This patent application claims the benefit of priority to U.S. provisional patent application No. 62/877,167, filed Jul. 22, 2019, which is hereby incorporated by reference in its entirety; and this patent application claims the benefit of priority to U.S. provisional patent application No. 62/877,182, filed Jul. 22, 2019, which is hereby incorporated by reference in its entirety.

BACKGROUND

Image processing generally uses computer techniques to alter or generate one or more images. Image processing can include classification, feature extraction, multi-scale analysis, pattern recognition, projection, or the like. Image processing can include applying a filter or mask to image data, performing a fast Fourier transform (FFT), padding, an affine transformation, or the like. Image processing can include registering a first image to an image space of a reference image. Image registration is the process of aligning two or more images of a same scene. In image registration, one image is designated as a reference image and a geometric transformation between the reference image and the first image is applied to transform the first image to the image space of the reference image.

DETAILED DESCRIPTION

Figure 1:
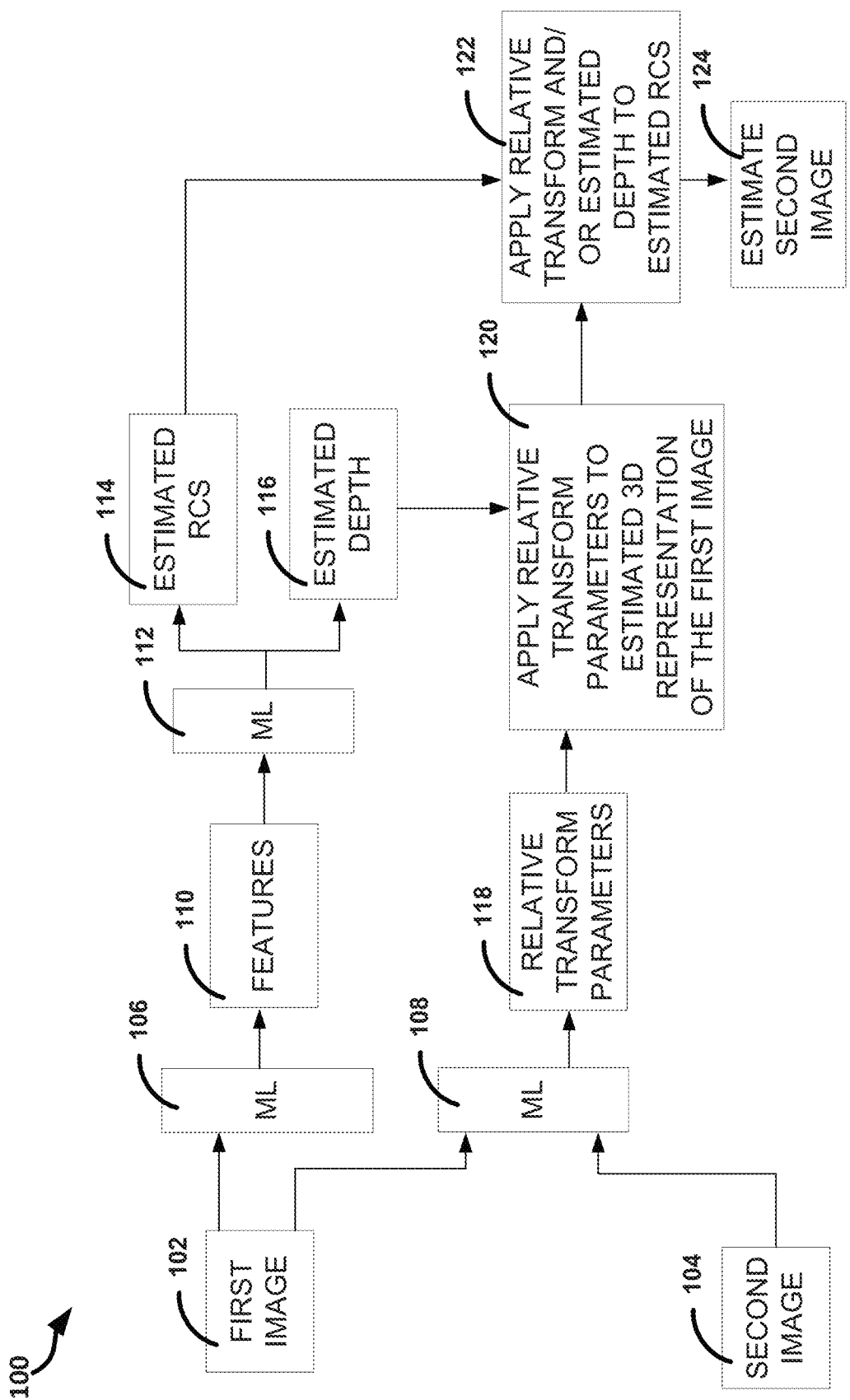
FIG. 1 illustrates, by way of example, a diagram of an embodiment of a system for image processing.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments relate to image registration or image generation. Some embodiments regard image registration using machine learning (ML). The ML technique can use geometric diversity or co-incident sensors as feedback. The ML technique can register images to each other, rather than using a direct calculation. Three-dimensional (3D) scene information can be extracted from the process. A disambiguated depth per image pixel can be learned via a self-supervised mechanism if either (i) another nearby, but spatially offset sensor senses the same scene (e.g., at the same time) allowing for similar phenomenology as stereo depth estimation, or (ii) the same sensor is moving and continuously recording video (allowing for similar phenomenology as structure from motion).

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Embodiments can provide a registration of first and second image data to each other or generate an image of a second type based on an image of a first type. The second image can be of a same scene, or a portion of the scene, as that of the first image. Said another way, the first image and the second image can have an overlapping field of view. The second image can be captured from a different perspective than the first image. The registration can use an ML technique, such as a deep learning NN technique. The technique provides improvements over prior learning techniques. One improvement can include that the deep learning NN technique is unsupervised and thus more scalable. In unsupervised ML, there is no need to label the data as there is in supervised ML. The sheer number of a data points that need to be labeled, which is provided by human labeling of data, makes the supervised techniques less scalable. Using an unsupervised ML technique makes the registration scalable and faster to implement than the supervised ML technique.

Registration at the scattering object level for synthetic aperture radar (SAR) or synthetic aperture sonar (SAS) and other imagery is challenging due, at least in part, to the difference in projection and scattering signatures. Embodiments can include an ML technique that learns to register the SAR or SAS image to another image of a different image type via an unsupervised deep learning technique. Embodiments can be applied to coincident SAR or SAS and other imagery (e.g., visible band, infrared (IR), light detection and ranging (LIDAR), or the like). At inference time, embodiments can quickly register the imagery. The first or second image can be captured using one or more sensors mounted on/in a vehicle, such as an airborne or land vehicle, a stationary platform, a device under control of a human or robot, or the like.

Embodiments can estimate three-dimensional (3D) content of the scene and expected radar cross-section (RCS) of objects given one or more visible band images. Embodiments can thus estimate a SAR or SAS image based on a visible band image and a perspective for the SAR or SAS image capture point.

The deep network can be trained to estimate approximate RCS and depth (e.g., per pixel). The RCS and depth can be used to reconstruct the SAR image as seen from the SAR slant plane. Given a scene center point (SCP) and the first and last position of a radar during the SAR collection (call these points X1 and X2), the slant plane can be derived according to:

$R_1 = X_1 - SCP$ (vector pointing from scene center to first position of radar)

$R_2 = X_2 - SCP$ (vector pointing from scene center to last position of radar)

$\hat{Y} \cong 0.5*(R_1+R_2)$ (range direction, vector pointing to midpoint of first and last position of radar)

$\hat{Z} = R_1 \times R_2$ (vector pointing perpendicular to slant plane, where "x" is the cross product)

$\hat{X} = \hat{Z} \times \hat{Y}$ (cross range direction vector)

The slant plane is spanned by $\hat{X}$ and $\hat{Y}$ (range). $\hat{Z}$ is a perpendicular vector to the slant plane.

Embodiments can use an approximately orthogonal projection of a reference frame to a second image space. Embodiments can be applicable to platforms with a first image sensor and a second image sensor located on a same platform or otherwise physically close to each other.

Innovations of embodiments can include learning the registration rather than calculating it directly, estimating a SAR (or another image type) image based on an image of a different image type, or estimating RCS based on a non-SAR image. The ML techniques of embodiments can provide fast test-time inferences, such as for real-time multi-spectral fusion applications. The ML techniques of embodiments can generate a 3D multi-spectral scene reconstruction based on the image data from multiple sensors. Embodiments can provide the 3D multi-spectral scene reconstruction for arbitrary display reference frames.

Embodiments can learn a registration of co-incident images (images of a same scene or images that include an overlap in the scene) using an unsupervised deep learning technique. At inference time, embodiments can register the co-incident images. At inference time, embodiments can estimate 3D content of a scene and expected RCS of objects given visible band image data of the images. The RCS is a measure of a ratio of backscatter density in the direction of the radar (from the target) to a power density that is intercepted by the target.

Prior techniques of image registration include using interferometric SAR images, or exquisite metadata and sensor calibration. Some prior registration techniques include automated, semi-automated, or hand-selected landmark feature-based matching and registration based thereon.

FIG. 1 illustrates, by way of example, a diagram of an embodiment of a system 100 for ML image processing. The system 100 as illustrated includes a first image 102 and a second image 104 used as inputs to ML techniques 106, 108. The ML techniques 106, 108 can be different layers of a neural network (NN) or different ML techniques.

The first image 102 can include a visible spectrum image, infrared (IR) image, light detection and ranging (LIDAR), or the like. An example of a visible spectrum image is an electro-optical (EO) image or a frame of a video. A visible spectrum image can be generated using a charge coupled device, or the like, that converts light incident thereon to an electrical signal. A parameter of the electrical signal can indicate an intensity, color, or the like of the light incident thereon.

The second image 104 can include a synthetic aperture radar (SAR) image or a synthetic aperture sonar (SAS) image. SAR uses motion of a radar antenna over a geographical region to provide spatial resolution. A SAR image device is typically situated on an aerial vehicle, such as an aircraft (e.g., an airplane, unmanned aerial vehicle, or the like) or spacecraft (e.g., a satellite, space station, or the like). A distance the SAR device travels over a region in a time it takes for a pulse to return to the antenna creates the "size" of the antenna. A SAR image can be created by a static physical antenna or a smaller moving antenna.

SAS operates in a manner similar to SAR, with SAS using reflected audio waves instead of electromagnetic waves as are used in SAR. A SAS device can be moved while illuminating a same location. Using coherent reorganization of the received sonar waves, an image can be produced.

The ML technique 106, 108, 112 can include one or more of an NN, a Bayesian technique, a K-means clustering technique, a Support Vector Machine (SVM) technique, a linear regression technique, a decision tree, a random forest technique, a logistic regression technique, and a nearest neighbor technique, among others. The NNs can include deep learning NNs. The NNs can be hierarchical, in which one layer depends on an output of a previous layer, or parallel, in which a layer can operate independent of an output of another layer.

The NNs can include a fully or partially convolutional NN, a deep convolutional network with a dilated convolution, a deep convolutional network with a residual block or densely connected convolutional block, a convolutional architecture with an auto-encoder, a U-Net convolutional architecture (e.g., with a skip connection), or a recurrent convolutional network architecture. A fully convolutional architecture includes an NN composed of convolutional layers without any fully connected layers or a multi-layer perceptron (MLP). A partially convolutional architecture includes an NN in which overall image dimensions decrease nearer an output layer until all features are flattened to a vector. The dimension decrease can be provided using max pooling layer, or the like. It is common to refer to what is called a partially convolutional NN herein as a convolutional NN. A deep convolutional NN is a convolutional NN with more than two NN layers. A dilated convolution integrates a more global context into, for example, object detection or segmentation. In dilated convolutional networks, a dilation factor is greater than one and usually increases linearly or exponentially at each layer for faster growth of the receptive field of the network. A difference between a dilated convolutional NN and a normal convolutional NN is that the dilation factor for a normal convolutional NN is 1. The receptive field is how many pixels have contributed some information to single neuron in a network. Neurons that are in deeper layers of an NN usually have a larger receptive field because a larger section of the input image has been used in the computation of that neuron. A dilated convolutional NN is completely convolutional (unlike max pooling) and allows for just as much, if not more, receptive field growth.

A residual block is a special case of a highway network without any gates in a skip connection. A residual block allows the flow of memory (or information) from initial layers to last layers. A densely connected convolutional block includes connections from each layer to every other layer of the NN. An autoencoder includes encoder and decoder NNs that transform input space to a feature space and back to the input space. An autoencoder may be compressive, if the number of dimensions in the feature space is fewer than the number of input dimensions. Variational autoencoders (VAE), or denoising autoencoders are examples of autoencoders. A modified fully-convolutional UNET architecture is an example of a network segmentation model that may be trained using an autoencoder. Once trained, the encoder network of an autoencoder may be used to transform the received data into the learned feature space of the autoencoder. The transformed data may then be used as input to the ML technique or within the ML technique. A description of U-NET can be found in the publication "U-Net: Convolutional Networks for Biomedical Image Segmentation" by Olaf Ronneberger, Philipp Fischer, and Thomas Brox. A recurrent convolutional NN uses a recurrent architecture with convolutions. The most common way this is done is by using convolutions to extract dense image features, and then recurrently processing the dense features. A less common way to implement a recurrent convolutional NN is to apply recurrent networks to small receptive fields convolutionally across the image.

A CNN is a feed-forward ML technique that is generally used for an image analysis tasks. The CNN accepts pixel values as input and layers carry out feature extraction from the CNN. The CNN can include one or more convolution layers, activation functions (e.g., a rectified linear unit (ReLU) or exponential linear unit (ELU), or the like), or normalization layers (e.g., batch normalization, layer normalization, or group normalization layers), pooling (e.g., max, average, or the like) layers, or the like. A pooling layer can flatten X and Y image dimensions of an image.

The ML techniques 106, 108, 112 can include a same or different ML techniques. In some embodiments, one or more of the ML techniques 106, 108, 112 include convolutional NNs (CNNs). The ML technique 106 can identify and generate features 110 of the first image 102. The features 110 are individual measurable properties of the first image 102. The ML technique 106 can transform the first image 102 into a meaningful representation, namely the features 110.

In embodiments in which the ML technique 106, 108, 112 includes a CNN, the features 110 can be considered convolutional features. The CNN layer is a sort of convolution filter that is applied to the input to produce the features 110.

The features 110 can be provided to ML technique 112 that provides an estimated RCS 114 or estimated depth 116. The ML technique 112 can be same or different from the ML technique 106, 108. The ML technique 112 can include a fully-convolutional layer (in an example of a CNN). The full-convolutional layer can characterize the features 110 into the estimated RCS 114 or the estimated depth 116.

The estimated RCS 114 of an object can be different and unrelated to a physical cross-sectional area of the object. The RCS is an effective area that scatters incident signals back to the radar receiver isotropically. This is described concisely by a monostatic radar equation:

$$P_r = \frac{P_t G_t}{4\pi r^2} \sigma \frac{A_{\mathit{eff}}}{4\pi r^2}$$

Where $P_t$ is the transmitter input power, $G_t$ is a gain of a transmitter antenna, r is a distance from the radar to the target, a is the RCS, $A_{\mathit{eff}}$ is the effective area of the radar receiving antenna, $P_r$ and is the power received back from the target by the radar. The first term, $$\frac{P_t G_t}{4\pi r^2},$$

represents the power density of the radar transmitter at the target. The second term, σ, is the RCS, so $$\frac{P_t G_t}{4\pi r^2}\sigma$$

represents power intercepted by the target. The term, $$\frac{1}{4\pi r^2}$$

represents spreading (isotropic spreading) of the power from the target back to the receiver. The receiver collects the power density with effective area, $A_{\mathit{eff}}$.

RCS can be affected by one or more of many factors, such as size of the target, material of the target, absorption properties of the target, shape and orientation of the target, or the like. In effect, the ML techniques 106, 112 can model these properties of a target based on the first image 102. The ML techniques 106, 112 can determine the RCS 114 based on the determined properties. In mathematical terms, RCS can be determined as:

$$\sigma = \lim_{r \to \infty} 4\pi r^2 |E_s|^2 / |E_i|^2$$

Where $E_s$ is the far field scattered electric field intensity and $E_i$ is the far field incident electric field intensity. In some embodiments, the ML techniques 106, 112 can model $E_s$ and $E_i$ based on the first image 102.

The ML technique 108 receives the first image 102 and the second image 104. The ML technique 108 determines relative transform parameters 118 between the first image 102 and the second image 104. The transform parameters 118 can include a rotation, translation or scaling (e.g., of intensity, brightness, contrast, or the like), or the like. The transform parameters 118 can be learned such that a pixel in the image 102 corresponds to a pixel in the image 104 after a transform in accord with the transform parameters is applied thereto. The ML technique 108 can include a deep convolutional network that maps image pairs to a vector of much smaller dimension (for example 6, which corresponds to rotational and translation imaging sensor pose difference in three dimensions). Examples include convolutional residual networks or densely-connected convolutional networks.

The ML technique 108 can include a deep dense network. In a deep dense network (sometimes called a fully-connected network) a fully connected or dense layer performs a linear operation in which every input is connected to output by a weight. A dense residual network includes a skip connection to jump over some layers. One or more of the ML techniques 106, 108, 112 can be a component of a spatial transformer network. The operation 122 can include a differential image resampling procedure initially used in spatial transformer networks.

At operation 120, the estimated relative transform parameters determined at operation 118 are applied to an estimated 3D representation of the first image 102. The transform can include a projection of each pixel in the first image 102 to the second image 104 based on the estimated depth 116, the estimated RCS 114, and the learned relative transform parameters 118. Bilinear interpolation of neighboring corner pixel values (top-left, bottom-left, top-right, bottom-right) can be used to determine the value of the second image 104 at the corresponding pixel of the first image 102. The 3D representation is a combination of the first image 102 (including (x, y) coordinates in space) and the estimated depth 116 determined by the ML technique 112. The relative transform parameters 118 determined by the ML technique 108 can be applied to this 3D representation.

The parameters can be for a general image projection. The ML technique 108 can learn both extrinsic and intrinsic imaging parameters. An example of an extrinsic parameter includes sensor pose with respect to the scene. An example of an intrinsic parameter includes a camera parameter, such as focal length.

At operation 122, the RCS 114 from the ML technique 112 and the transformed output from the operation 120 are used to generate an estimated second image 124. At operation 122, the estimated RCS 114 of the first image 102 can be projected to the space of the second image to generate a SAR view of the first image 102. Image geometry, defined in metadata, can be used to perform the projection. There are many known projection techniques for projecting an image from its image space to a different image space. The estimated RCS 114 can be projected to the image space of the second image 104 using one of these techniques. A difference between the estimated second image 124 and the second image 104 can define feedback, such as to train the ML technique 106, 108, 112.

Figure 2:
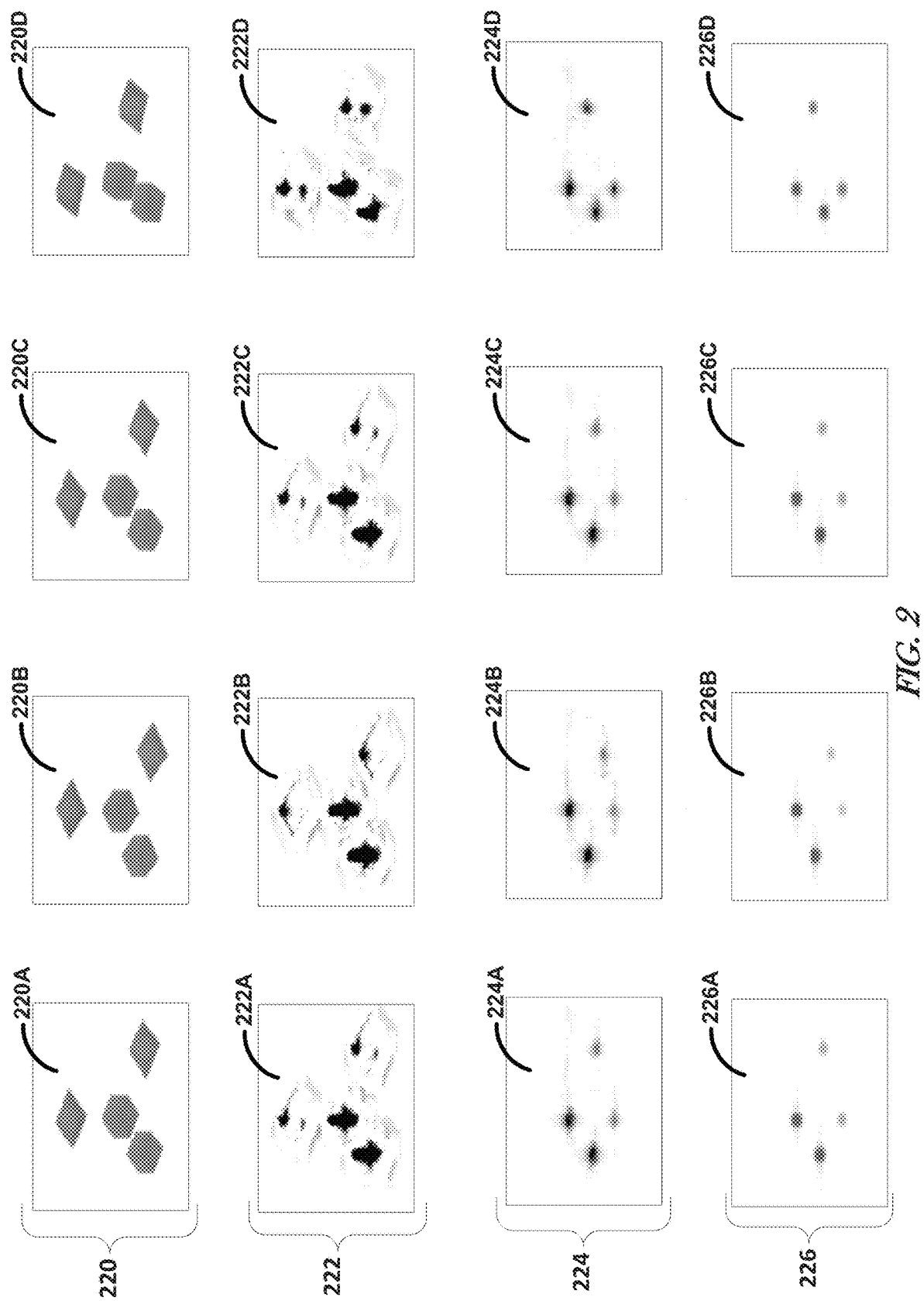
FIG. 2 illustrates, by way of example, diagrams of embodiments of input images and corresponding system outputs.

FIG. 2 illustrates, by way of example a diagram of an embodiment of instances of inputs and outputs of the system 100. The input and outputs include an input image 220, an estimated RCS 222, another estimated RCS 224 that provides a view of the estimated RCS 222 transformed to an image space of a true second image 226. The input image 220 is an example of the first image 102. The true second image 226 is an example of the second image 104. The estimated RCS 222 is an output of the ML technique 112. The estimated RCS 224 transformed to the second image space is an example of output of the operation 124. The system 100 can be used to generate a SAR or SAS image based on just the first image 102, after the ML techniques 106, 108, 112 are trained.

Using the system 100, estimated RCS 222A, 222B, 222C, 222D can be determined based on the input image 220A, 220B, 220C, 220D, respectively. The estimated RCS 222A-222D can be projected to a space that is different from the space of the input image 220A-220D, such as a space of a true second image 226A, 226B, 226C, 226D. The result of the projection can be another estimated RCS 224A, 224B, 224C, 224D. The true second image 226A, 226B, 226C, 226D is provided to show how close the estimated RCS 224A, 224B, 224C, 224D estimates a target (the true second image 226A, 226B, 226C, 226D in this example).

A first image 220 can be converted to a different type of image using the system 100. Two images 220, 226 can be registered to each other using the system 100. The transform between the two image spaces can be learned and applied to one of the images 102, 104 to register one image to the other.

Note that a number with a suffix (e.g., input image 220A) represents a specific instance of the number without the suffix (e.g., input image 220).

Figure 3:
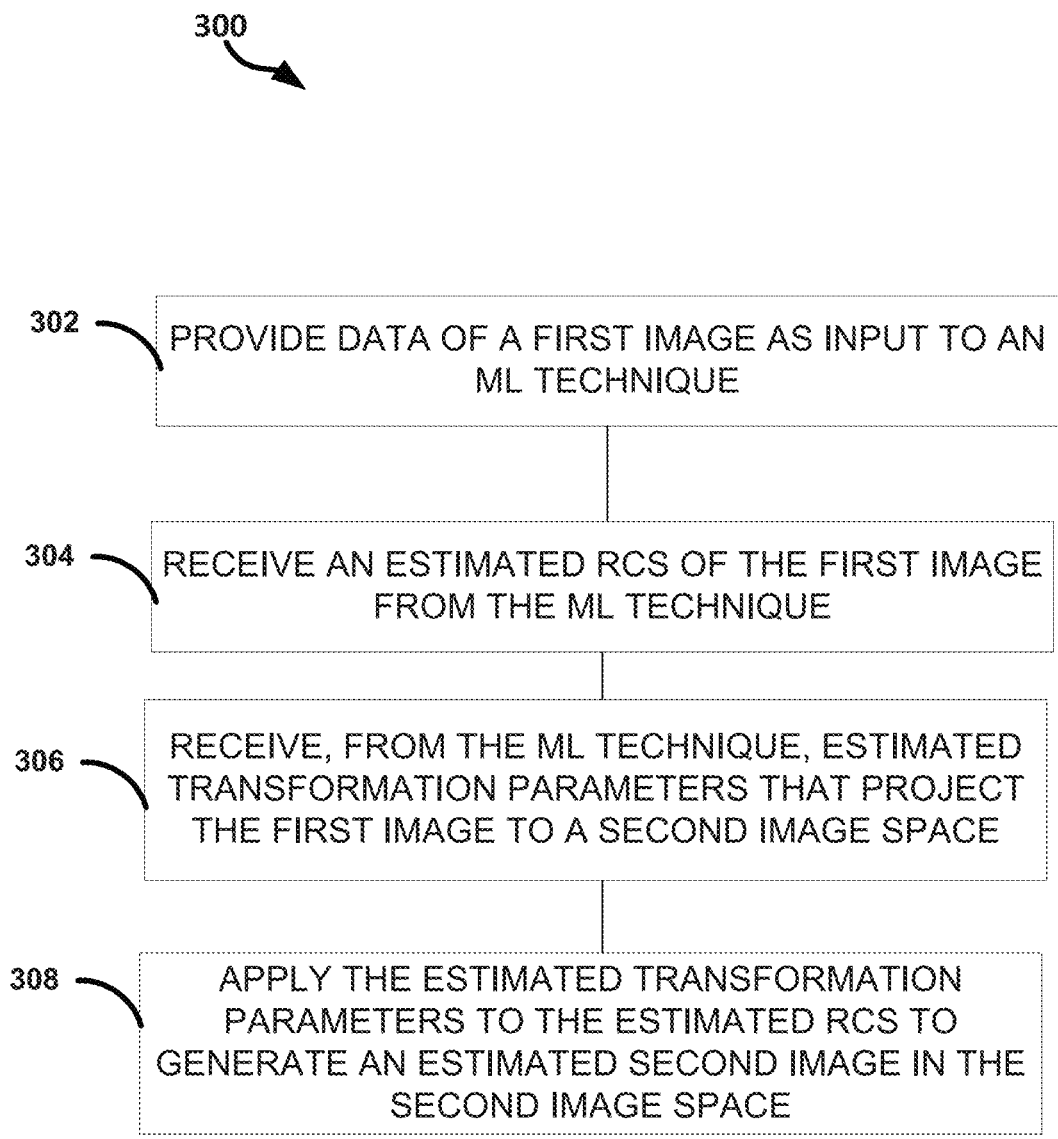
FIG. 3 illustrates, by way of example, a diagram of an embodiment of a method for image processing.

FIG. 3 illustrates, by way of example, a diagram of an embodiment of a method 300 for image processing. The image processing can include performing a multi-modal regression. Multi-modal means images from sensors of different modes, such as a visible band sensor, a SAR sensor, a SAS sensor, or the like. An image from one mode can be projected to an image space of an image from another mode in performing the multi-modal regression.

The method 300 as illustrated includes providing, as input to an ML technique, data of a first image, at operation 302; receiving, from the ML technique, an estimated radar cross section (RCS) of the first image, at operation 304; receiving, from the ML technique, estimated transformation parameters that project the first image to a second image space, at operation 306; and applying the estimated transformation parameters to the estimated RCS to generate an estimated second image in the second image space, at operation 308.

The method 300 can further include providing a second image of the geographical region to the ML technique. The method 300 can further include, wherein the first image is generated by a first type of image sensor and the second image is generated by a second type of image sensor. The method 300 can further include, wherein the first type includes one of a visible spectrum sensor, an infrared sensor, and a light detection and ranging sensor and the second type includes one of a synthetic aperture radar and a synthetic aperture sonar sensor. The method 300 can further include, wherein the ML technique includes a first portion to estimate the RCS and a second portion to estimate the transformation parameters.

The method 300 can further include, wherein the input to the first portion includes the first image, and the input to the second portion, during training, includes the first image and the second image. The method 300 can further include, wherein the first portion is further to estimate depth in the first image and applying the estimated depth, along with the transformation parameters to the RCS to generate an estimated second image in the second image space. The method 300 can further include, wherein the ML technique is trained using first images generated using a sensor of a first sensor type and second images generated using a sensor of a different second sensor type, and feedback that is a difference between the second image and the estimated second image. The method 300 can further include applying the estimated transform to the first image to register the first and second images to each other.

While the discussion in this application regards transforming one image to an image of a second image space or registering two images to each other, the subject is applicable to collections of more than two images. For example, consider three images, two visible band images at different poses, and one SAR image. The relative transform parameters can be determined for each of the transformations between (1) the two visible band images, (2) a first visible band image and the SAR image, and (3) the second visible band image and the SAR image. Given N images, this would be N choose 2 transformations. With the RCS and depth, either of the visible images can be transformed to the image space of the SAR image.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus (e.g., a programmable processor, a computer, or multiple computers).

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 4:
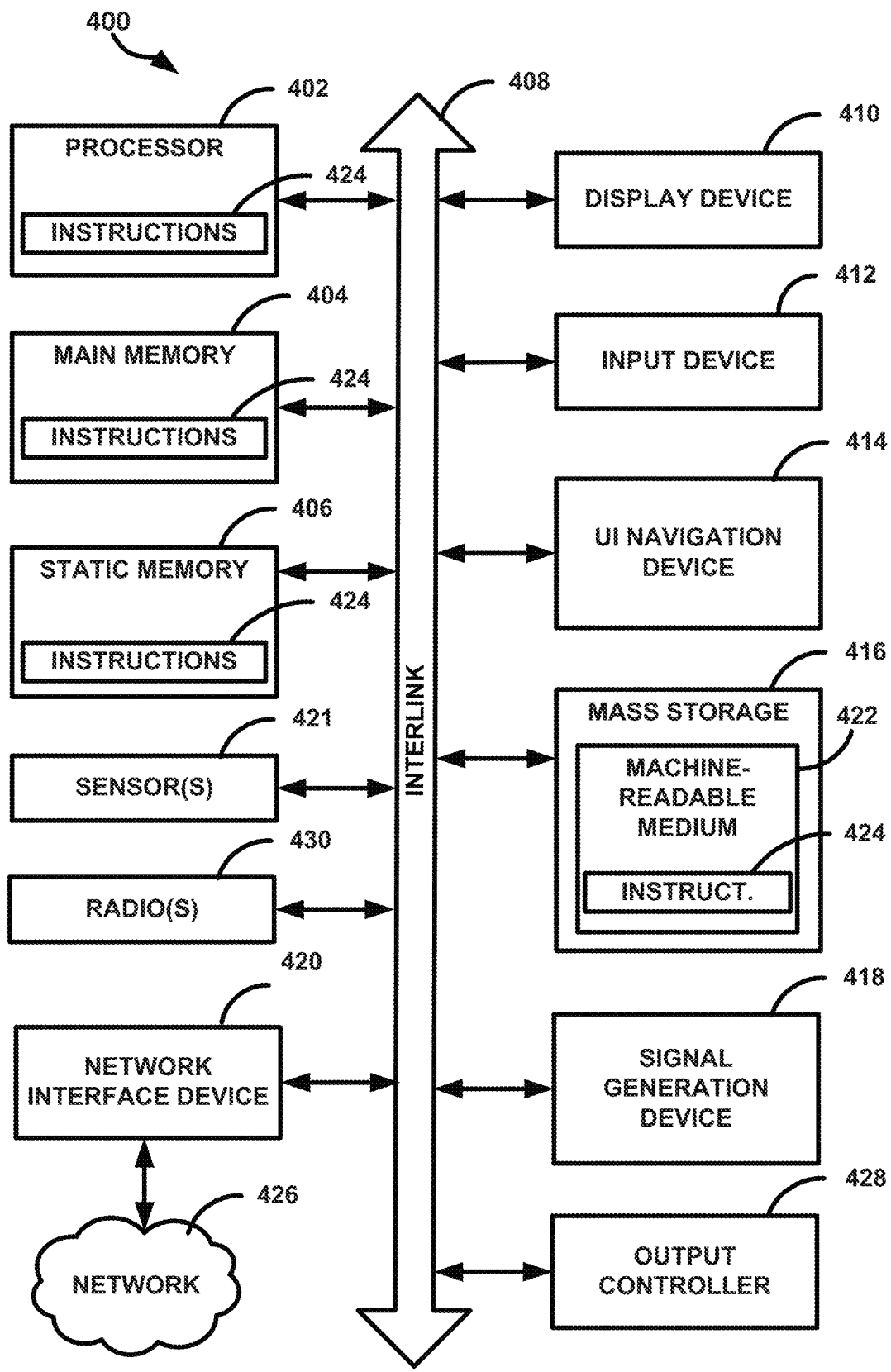
FIG. 4 illustrates, by way of example, a block diagram of an embodiment of a machine (e.g., a computer system) to implement one or more embodiments.

FIG. 4 illustrates, by way of example, a block diagram of an embodiment of a machine in the example form of a computer system 400 within which instructions, for causing the machine to perform any one or more of the methodologies discussed herein, may be executed. One or more of the ML techniques 106, 108, 112 or operations 120, 122 can be implemented or performed by the computer system 400. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, sensors 421 (e.g., a transducer that converts one form of energy (e.g., light, heat, electrical, mechanical, or other energy) to another form of energy), such as an IR, SAR, SAS, visible, or other image sensor, or the like, or a combination thereof), or the like, or a combination thereof), a main memory 404 and a static memory 406, which communicate with each other via a bus 408. The memory 404, 406 can store parameters (sometimes called weights) that define operations the ML technique 106, 108, 112. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker), a network interface device 420, and radios 430 such as Bluetooth, WWAN, WLAN, and NFC, permitting the application of security controls on such protocols.

The machine 400 as illustrated includes an output controller 428. The output controller 428 manages data flow to/from the machine 400. The output controller 428 is sometimes called a device controller, with software that directly interacts with the output controller 428 being called a device driver.

Machine-Readable Medium

The disk drive unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404, the static memory 406, and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Some Illustrative Examples

Example 1 includes a system for image registration and multi-modal regression, the system comprising a memory to store parameters defining a machine learning (ML) model, the ML technique for image processing, and processing circuitry to provide, as input to the ML technique, data of a first image, receive, from the ML technique, an estimated radar cross section (RCS) of the first image, receive, from the ML technique, estimated transformation parameters that project the first image to a second image space, and apply the estimated transformation parameters to the estimated RCS to generate an estimated second image in the second image space.

In Example 2, Example 1 can further include, wherein the processing circuitry is further to, provide a second image of the geographical region to the ML technique.

In Example 3, Example 2 can further include, wherein the first image is generated by a first type of image sensor and the second image is generated by a second type of image sensor.

In Example 4, Example 3 can further include, wherein the first type includes one of a visible spectrum sensor, an infrared sensor, and a light detection and ranging sensor and the second type includes one of a synthetic aperture radar and a synthetic aperture sonar sensor.

In Example 5, at least one of Examples 3-4 can further include, wherein the ML technique includes a first portion to estimate the RCS and a second portion to estimate the transformation parameters.

In Example 6, Example 5 can further include, wherein the input to the first portion includes the first image, and the input to the second portion, during training, includes the first image and the second image.

In Example 7, Example 6 can further include, wherein the first portion is further to estimate depth in the first image and the processing circuitry is further to apply the estimated depth, along with the transformation parameters to the RCS to generate an estimated second image in the second image space.

In Example 8, at least one of Examples 1-7 can further include, wherein the ML technique is trained using first images generated using a sensor of a first sensor type and second images generated using a sensor of a different second sensor type, and feedback that is a difference between the second image and the estimated second image.

In Example 9, at least one of Examples 1-8 can further include, wherein the processing circuitry is to apply the estimated transform to the first image to register the first and second images to each other.

Example 10 includes a non-transitory machine-readable medium including instructions that, when executed by a machine, cause the machine to perform operations comprising providing, as input to a machine learning (ML) model for image processing, data of a first image, receiving, from the ML technique, an estimated radar cross section (RCS) of the first image, receiving, from the ML technique, estimated transformation parameters that project the first image to a second image space, and applying the estimated transformation parameters to the estimated RCS to generate an estimated second image in the second image space.

In Example 11, Example 10 can further include, wherein the operations further comprise providing a second image to the ML technique, the second image including an overlapping field of view with the first image.

In Example 12, Example 11 can further include, wherein the first image is generated by a first type of image sensor and the second image is generated by a second type of image sensor.

In Example 13, Example 12 can further include, wherein the first type includes one of a visible spectrum sensor, an infrared sensor, and a light detection and ranging sensor and the second type includes one of a synthetic aperture radar and a synthetic aperture sonar sensor.

In Example 14, at least one of Examples 12-13 can further include, wherein the ML technique includes a first portion to estimate the RCS and a second portion to estimate the transformation parameters.

In Example 15, Example 14 can further include, wherein the input to the first portion includes the first image, and the input to the second portion, during training, includes the first image and the second image.

In Example 16, Example 15 can further include, wherein the first portion is further to estimate depth in the first image and the processing circuitry is further to apply the estimated depth, along with the transformation parameters to the RCS to generate the estimated second image in the second image space.

Example 17 includes a method for multi-modal regression performed by a machine learning (ML) technique implemented using processing circuitry of a machine, the method comprising providing, as input to the ML technique, data of a first image, receiving, from the ML technique, an estimated radar cross section (RCS) of the first image, receiving, from the ML technique, estimated transformation parameters that project the first image to a second image space, and applying the estimated transformation parameters to the estimated RCS to generate an estimated second image in the second image space.

In Example 18, Example 17 can further include training the ML technique using first images generated using a sensor of a first sensor type and second images generated using a sensor of a different second sensor type, and feedback that is a difference between the second image and the estimated second image.

In Example 19, at least one of Examples 17-18 can further include applying the estimated transform to the first image to register the first and second images to each other. In Example 20, at least one of Example 17-19 can further include, wherein the ML technique includes a first portion to estimate the RCS and a second portion to estimate the transformation parameters, the input to the first portion includes the first image, the input to the second portion, during training, includes the first image and the second image, and the first portion is further to estimate depth in the first image and the processing circuitry is further to apply the estimated depth, along with the transformation parameters to the RCS to generate the estimated second image in the second image space.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for image registration and multi-modal regression, the system comprising:
   a memory to store parameters defining a machine learning (ML) model for image processing; and
   processing circuitry to:
   provide, as input to the ML model, data of a first image;
   receive, from a fully-convolutional layer of the ML model, an estimated radar cross section (RCS) of the first image, the RCS is an effective area that scatters incident signals back to a radar and governed by a monostatic radar equation;
   receive, from a convolutional residual network or densely-connected convolution network of the ML model, estimated transformation parameters that project the first image to a second image space of a synthetic aperture radar (SAR) or synthetic aperture sonar (SAS) image; and
   apply the estimated transformation parameters to the estimated RCS to generate an estimated second image in the second image space, the estimated second image is an estimated SAR or SAS image.

2. The system of claim 1, wherein the processing circuitry is further to, provide a second image of the geographical region to the ML model.

3. The system of claim 2, wherein the first image is generated by a first type of image sensor and the second image is generated by a second type of image sensor.

4. The system of claim 3, wherein the first type includes one of a visible spectrum sensor, an infrared sensor, and a light detection and ranging sensor and the second type includes one of a synthetic aperture radar and a synthetic aperture sonar sensor.

5. The system of claim 3, wherein:
   the input to the first portion includes the first image; and
   the input to the second portion, during training, includes the first image and the second image.

6. The system of claim 5, wherein the first portion is further to estimate depth in the first image and the processing circuitry is further to apply the estimated depth, along with the transformation parameters to the RCS to generate the estimated second image in the second image space.

7. The system of claim 1, wherein the ML model is trained using first images generated using a first sensor of a first sensor type and second images generated using a second sensor of a different second sensor type, and feedback that is a difference between the second image and the estimated second image.

8. The system of claim 1, wherein the processing circuitry is to apply the estimated transform to the first image to register the first and second images to each other.

9. A non-transitory machine-readable medium including instructions that, when executed by a machine, cause the machine to perform operations comprising:
   providing, as input to a machine learning (ML) model for image processing, data of a first image;
   receiving, from a fully-convolutional layer of the ML model; an estimated radar cross section (RCS) of the first image, the RCS is an effective area that scatters incident signals back to a radar and governed by a monostatic radar equation;
   receiving, from a convolutional residual network or densely-connected convolution network of the ML model, estimated transformation parameters that project the first image to a second image space of a synthetic aperture radar (SAR) or synthetic aperture sonar (SAS) image; and
   applying the estimated transformation parameters to the estimated RCS to generate an estimated second image in the second image space, the estimated second image is an estimated SAR or SAS image.

10. The non-transitory machine-readable medium of claim 9, wherein the operations further comprise providing a second image to the ML model, the second image including an overlapping field of view with the first image.

11. The non-transitory machine-readable medium of claim 10, wherein the first image is generated by a first type of image sensor and the second image is generated by a second type of image sensor.

12. The non-transitory machine-readable medium of claim 11, wherein the first type includes one of a visible spectrum sensor, an infrared sensor, and a light detection and ranging sensor and the second type includes one of a synthetic aperture radar and a synthetic aperture sonar sensor.

13. The non-transitory machine-readable medium of claim 11, wherein:
   the input to the first portion includes the first image; and the input to the second portion, during training, includes the first image and the second image.

14. The non-transitory machine-readable medium of claim 13, wherein the first portion is further to estimate depth in the first image and the processing circuitry is further to apply the estimated depth, along with the transformation parameters to the RCS to generate the estimated second image in the second image space.

15. A method for multi-modal regression performed by a machine learning (ML) technique implemented using processing circuitry of a machine, the method comprising:
   providing, as input to the ML technique, data of a first image;
   receiving, from a fully-convolutional layer of the ML technique, an estimated radar cross section (RCS) of the first image, the RCS is an effective area that scatters incident signals back to a radar and governed by a monostatic radar equation;
   receiving, from a convolutional residual network or densely-connected convolution network of the ML technique, estimated transformation parameters that project the first image to a second image space of a synthetic aperture radar (SAR) or synthetic aperture sonar (SAS) image: and
   applying the estimated transformation parameters to the estimated RCS to generate an estimated second image in the second image space, the estimated second image is an estimated SAR or SAS image.

16. The method of claim 15, further comprising training the ML technique using first images generated using a sensor of a first sensor type and second images generated using a sensor of a different second sensor type, and feedback that is a difference between the second image and the estimated second image.

17. The method of claim 15, further comprising applying the estimated transform to the first image to register the first and second images to each other.

18. The method of claim 15, wherein:
   the input to the first portion includes the first image;
   the input to the second portion, during training, includes the first image and the second image; and
   the first portion is further to estimate depth in the first image and the processing circuitry is further to apply the estimated depth, along with the transformation parameters to the RCS to generate the estimated second image in the second image space.

* * * * *